United States Patent

[11] 3,543,766

[72] Inventor Edward J. Moe
 Mercer Island, Washington
[21] Appl. No. 658,753
[22] Filed Aug. 7, 1967
[45] Patented Dec. 1, 1970
[73] Assignee Temco Inc.
 Mercer Island, Washington
 a corporation of Washington

[54] PNEUMATIC PRODUCT HANDLING AND RECYCLE SYSTEM FOR MOBILE COMBINES
 3 Claims, 2 Drawing Figs.
[52] U.S. Cl. .................................................. 130/27
[51] Int. Cl. ..................................................... A01f 12/40
[50] Field of Search........................................... 130/2, 21, 26, 27.6, 27.32, 30(i), 33; 209/10, 257, 307; 171/14, 17

[56] References Cited
 UNITED STATES PATENTS
2,309,736 2/1943 Makin .......................... 130/27.5
2,433,162 12/1947 Scranton et al................ 130/27.6
2,867,322 1/1959 Weisenfeld.................... 171/14X
 FOREIGN PATENTS
 696,038 10/1930 France ........................ 130/27.32

*Primary Examiner*—Antonio F. Guida
*Attorney*—Seed, Berry & Dowrey

ABSTRACT: A pneumatic system for conveying peas or lima beans or like products within a mobile harvester or combine from the shelling discharge point to a holding bin and unloading point, and also for recycling pods, delivered and separated at the discharge point, to the threshing drum of the combine for reworking. In one form of the system a positive displacement blower directs an airstream through a conveying valve within a hopper or collector at the product discharge point of the combine to carry the shelled product to a positive receiver or holding bin. In the same system, the suction or intake side of the blower is connected to a suction conduit which receives the pods which have been separated from the shelled product at the combine discharge point. The pods are collected by a cyclone type receiver and discharged into the threshing drum by means of a rotary valve or the like for reworking. A second form of the system utilizes a positive displacement blower to direct an airstream through a conduit which receives the pods at the discharge and separation point and introduces the pods to the threshing drum of the combine to be reworked.

In this system the suction or intake side of the blower is connected to a suction line which picks up the shelled product by vacuum pressure from a hopper or funnel at the discharge point of the combine and delivers the product to a cyclone-type bin receiver which serves for holding and unloading the shelled product.

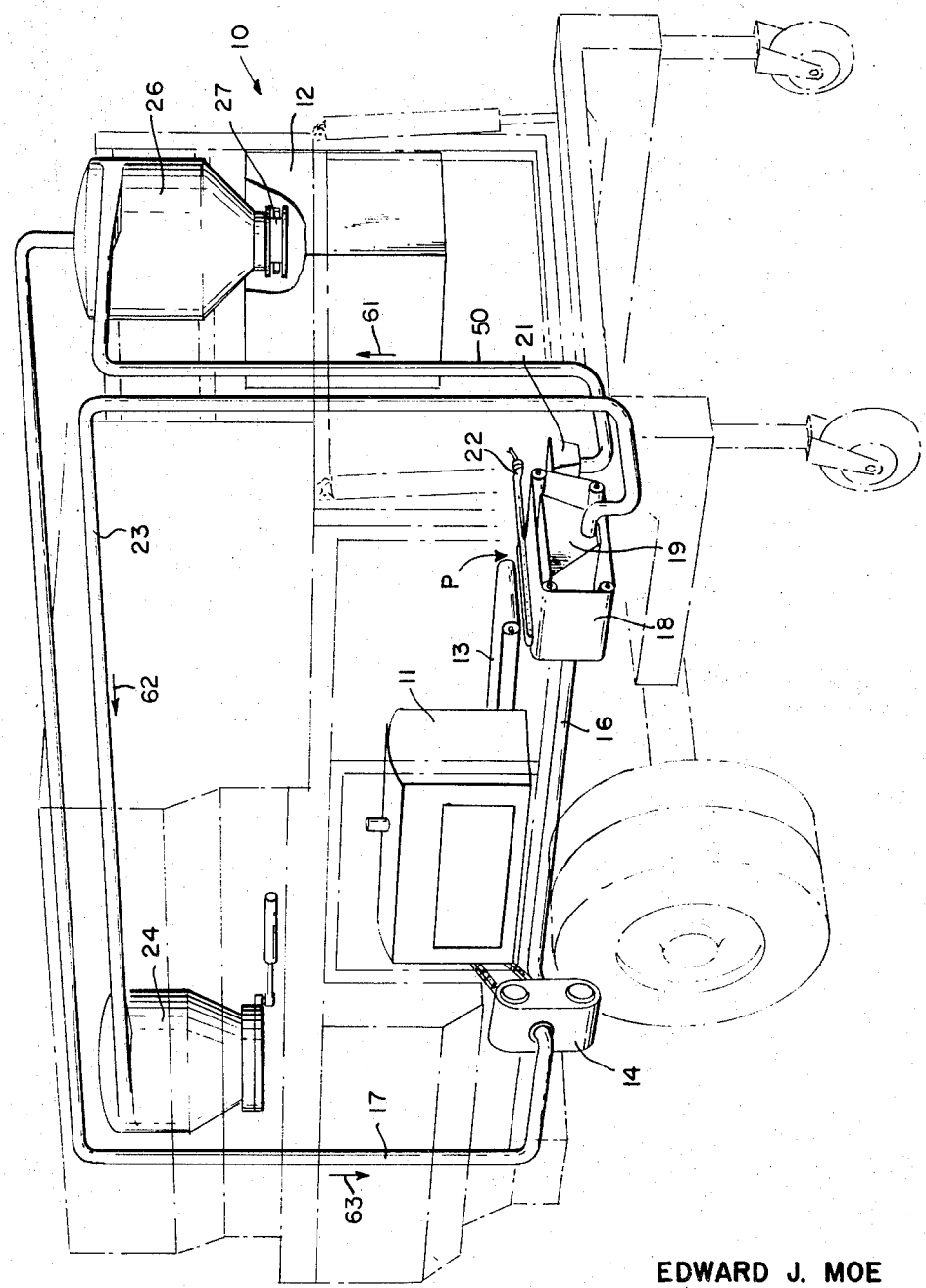

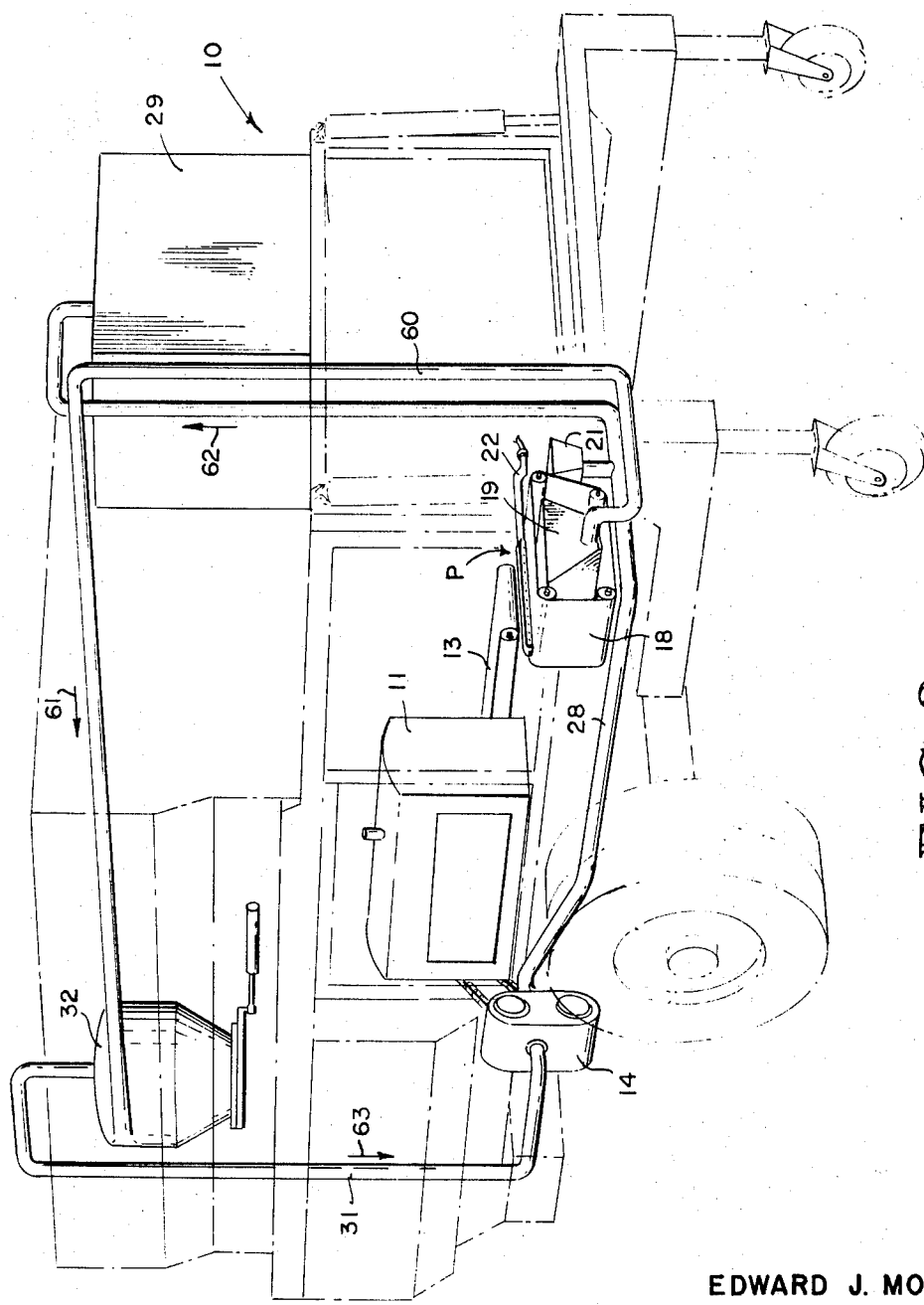

PNEUMATIC PRODUCT HANDLING AND RECYCLE SYSTEM FOR MOBILE COMBINES

The present invention relates to harvesters or combines used for harvesting and threshing crops such as peas or lima beans. Although various types of mechanical recycling apparatus is used for reworking the product several times, the final product discharged from the combine contains a significantly large percentage of unshelled or unthreshed product. Heretofore, the product taken from the combines in the field had to undergo a separation process when finally delivered to the processing plant. The present invention provides a separation point on the mobile combine itself, and either a positive or a negative pneumatic conveying system within the combine for conveying the separated product to a holding bin and recycling the pods directly to the threshing drum of the machine for reworking. The shelled product is then taken from the combine to the processing plant with no further separation being necessary. With the present invention, additional yield is obtained from the combine, and a great saving of time is accomplished by separating at the combine and delivering only the shelled product, ready for treatment at the processing plant.

An object of the present invention is, therefore, to provide a delivery and separation station on the mobile combine itself with a positive or negative pneumatic conveying system for conveying the shelled product to a holding bin and for recycling pods to the threshing drum of the combine to be reworked.

Other objects and advantages of the present invention will be apparent from the following specification and claims, and from the accompanying drawings wherein:

DESCRIPTION OF THE DRAWING

FIG. 1 illustrates a positive pneumatic conveying system applied to a combine; and FIG. 2 illustrates a negative pneumatic system applied to a combine.

DETAILED DESCRIPTION OF THE INVENTION

Referring now to the drawings wherein like reference numerals indicate identical parts in the various views, the positive system shown in FIG. 1 will first be described in detail. It will be understood that the mobile combine may be any known design, and the details of structure and design of the combine form no part of the present invention. The combine itself is shown in broken lines in FIG. 1, and indicated generally at 10. The combine will be understood to include a source of power such as a prime mover 11 or its equivalent and a receiver 12 for receiving the pods to be delivered to the threshing drum. In addition, a product transfer conveyor 13 which may be of any conventional design and which delivers the threshed or shelled product to the product discharge point of the combine designated generally at P. The actual physical location of the receiver 12 and product discharge point P, will depend upon the particular design of the combine involved.

For the purpose of the present specification the system illustrated in FIG. 1 is termed a "positive" system and that illustrated in FIG. 2 a "negative" system. The positive system is so designated since positive air pressure is used to pick up and convey the shelled product and the negative system is so designated because negative air pressure or vacuum is used to pick up and convey the shelled product.

Referring again to the positive system shown in FIG. 1, a positive displacement blower, compressor, or other source of air pressure 14 may be driven by the prime mover 11 or any other power means carried on by the combine. The conduit 16 is connected to the positive or high pressure side of the blower and the conduit 17 is connected to the suction or intake side of the blower. In all instances, it will be understood that the air pipes or conduits may vary in diameter, and may have an outside diameter in the range of approximately 1 to 8 inches with suitable flexible couplings and the like being utilized as required and with the various bends and curves in the conduits being fabricated so as to avoid impeding passage of the particular product being handled. These features are considered to be within the skill of one familiar with pneumatic systems for handling food products and are therefore not detailed in this specification.

The product is carried by the conveyor 13, which may be a chain and bucket arrangement if desired, which delivers on to a wide mesh belt 18 which allows the shelled peas or lima beans to pass therethrough and into a hopper or funnel shaped collector 19. The pods which have not been threshed will not pass through the belt 18 and are delivered to one side into the funnel or pan 21. At this point a blower pipe 22, connected to a suitable source of air pressure, may be used to eliminate chaff and dust. It will be understood, of course, that the belt 18 is a constantly running belt, and any means available may be used to drive the belt.

The positive air pressure conduit 16 passes an airstream through the hopper 19 and a rotary valve or venturi type valve well known in the art may be used to receive the product into the airstream. The airstream carries the product directly to a positive receiver or holding bin 24 for removal.

The suction conduit 17 is connected through the cyclone type receiver 26 and a conduit 50 with the hopper or pan 21 which is used to introduce pods into the suction line. The hopper 21 may act as a pickup funnel or venturi type valve. The receiver 26 may vary in design, but will include a device such as a rotary valve 27 commonly known to the art for discharging from a vacuum chamber to atmosphere without breaking the vacuum. The rotary valve 27 may be driven by any suitable means available on the combine and discharges the pods directly into the receiver 12 for delivery to the threshing drum on the combine. The pods of course are removed from the airstream by action of the cyclone receiver 26 in a known manner.

FIG. 2 illustrates the second form of the invention which has been termed a "negative" system. The same combine 10 with the prime mover 11, product discharge conveyor 13, and the discharge point P is illustrated. The blower 14 also bears the same relationship to the prime mover or other power means and may be located as described with reference to FIG. 1. Likewise, wide mesh belt 18, hoppers 19 and 21 and blower pipe 22 may be identical with that described in FIG. 1.

In the present embodiment, the conduit 28 is connected to the high pressure or outlet side of the blower 14 and pods collected in the pan 21 may be introduced into the airstream by suitable means such as a venturi type valve associated with the pan 21. The pods are conveyed to a receiver 29 which delivers the pods in a conventional manner directly to the threshing drum of the combine to be reworked. The details of the receiver and threshing drum are not required for an understanding of the invention.

A suction conduit 31 is connected to the intake side of the blower and is connected, through the cyclone receiver bin 32 and a conduit 60, to the hopper 19 at the product discharge point. The shelled product is removed from the hopper 19 by vacuum pressure and into the line 31 to be deposited in the holding bin 32. The shelled product may then be removed from the holding bin 32 when desired. Any suitable valve means known to the art for removing the product from bin 32 without breaking the vacuum in conduit 31 may be used. In both FIGS. of the drawing the directions of flow of product, pods, and clean air are indicated by arrows 61, 62 and 63, respectively.

From the foregoing it will be apparent to one skilled in the art that the present invention provides significant improvements in product handling and recycling system for mobile combines. The arrangement and types of structural components utilized within the invention may be subjected to numerous modifications well within the purview of this invention and applicant intends only to be limited to a liberal interpretation of the specification and appended claims.

I claim:

1. In combination with a mobile combine having product discharge means for delivering a product threshed by the combine to a discharge point and receiver means for receiving material to be rethreshed, a product handling and recycle system comprising; means to separate the threshed product from unthreshed material at the discharge point, first and second collector means for collecting the threshed product and unthreshed material respectively, blower means on said combine, first conduit means connected between one side of said blower means and said first collector means for conveying threshed product, and second conduit means connected between the other side of said blower and said second collector means for conveying the unthreshed material, said first conduit means including means to deliver the threshed product to a holding bin, and said second conduit means including means to deliver the unthreshed material to said receiver means of the combine for rethreshing, said blower has an air pressure outlet and a suction inlet, said first conduit means being connected to the inlet side of the blower and said second conduit means being connected to the outlet side thereof, said first collector means being adapted to introduce the threshed product into the first conduit means by vacuum pressure, cyclone receiver means in said first conduit means for removing the threshed product from the suction line and including valve means to discharge the product therefrom without breaking the vacuum pressure in the first conduit means, said second collector means being adapted to introduce the unthreshed material into the positive airstream for delivery to said receiver means of the combine to be rethreshed.

2. The combination according to claim 1 wherein said means to separate the threshed product from the unthreshed material comprises a continuously moveable mesh belt adapted to allow the threshed product to pass therethrough and to deliver said unthreshed material to said second collector, and air pressure means adjacent the separator means providing an airstream for cleaning foreign material from the product delivered at the discharge point.

3. The combination according to claim 1 wherein said blower means constitutes a positive displacement pneumatic pump.